(12) United States Patent
Mukawa et al.

(10) Patent No.: US 8,559,073 B2
(45) Date of Patent: Oct. 15, 2013

(54) BOOKLET READING DEVICE

(75) Inventors: Tatsuya Mukawa, Kanagawa (JP); Kazuki Saitou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 13/062,783

(22) PCT Filed: Mar. 1, 2010

(86) PCT No.: PCT/JP2010/001360
§ 371 (c)(1),
(2), (4) Date: Apr. 15, 2011

(87) PCT Pub. No.: WO2010/098143
PCT Pub. Date: Sep. 2, 2010

(65) Prior Publication Data
US 2012/0113483 A1     May 10, 2012

(30) Foreign Application Priority Data

Feb. 27, 2009    (JP) ................................ 2009-044998

(51) Int. Cl.
*H04N 1/04*     (2006.01)
*H04N 1/46*     (2006.01)
*H04N 9/80*     (2006.01)
*G03F 3/08*     (2006.01)
*G03C 5/00*     (2006.01)
*G06K 7/10*     (2006.01)
*G06K 9/74*     (2006.01)
*F21V 1/00*     (2006.01)
*B41J 11/50*     (2006.01)

(52) U.S. Cl.
USPC ........... 358/475; 358/504; 358/518; 358/498; 358/506; 430/30; 235/468; 356/71; 386/260; 362/239; 400/582

(58) Field of Classification Search
USPC ........... 358/475, 504, 518, 498, 506; 430/30; 235/408; 356/71; 386/260; 362/239; 400/582
See application file for complete search history.

(56) References Cited

U.S. PATENT DOCUMENTS 5,609,978 A *   3/1997   Giorgianni et al. ............. 430/30
2003/0012562 A1*   1/2003   Lawandy et al. ............. 386/126
(Continued)

FOREIGN PATENT DOCUMENTS

JP    58-142486 A    8/1983
JP    59-177896 A    10/1984
(Continued)

OTHER PUBLICATIONS

International search Report for PCT/JP2010/001360 dated Mar. 23, 2010.
(Continued)

*Primary Examiner* — Charlotte M Baker
*Assistant Examiner* — Rury Grisham
(74) *Attorney, Agent, or Firm* — Pearne & Gordon LLP

(57) ABSTRACT

A document reading device (1) comprises a mounting surface (5) on which a page to be read (9) of a passport (7) is placed, a camera (13) for taking an image of the page to be read (9), an illumination light source (15) for radiating illumination light that will be reflected on the page to be read (9), and an ultraviolet light source (41) for radiating ultraviolet light to activate a fluorescent material on the page to be read (9). The illumination light source (15) is located at a position corresponding to a first edge (73) perpendicular to a binding edge (71) on the page to be read (9) and radiates illumination light in the direction intersecting with the first edge (73). The ultraviolet light source (41) is located at a position corresponding to a second edge (75) parallel to the binding edge (71) and arranged to radiate ultraviolet light in the direction intersecting with the second edge (75). The illumination light source (15) includes an infrared light source (21) and a white light source (31). A document reading device is thus provided, which is provided with both an illumination light source and an ultraviolet light source, and can avoid image capturing in the specular reflection condition when the document is deformed, while the size of the device can be reduced.

5 Claims, 8 Drawing Sheets

(56) References Cited

U.S. PATENT DOCUMENTS

| | | | |
|---|---|---|---|
| 2003/0156274 A1* | 8/2003 | Massen et al. | 356/71 |
| 2003/0169415 A1* | 9/2003 | Premjeyanth et al. | 356/71 |
| 2005/0007776 A1* | 1/2005 | Monk et al. | 362/239 |
| 2005/0139681 A1* | 6/2005 | Premjeyanth et al. | 235/468 |
| 2007/0081204 A1* | 4/2007 | Ehbets et al. | 358/504 |
| 2008/0239414 A1* | 10/2008 | Misu | 358/498 |
| 2011/0211896 A1* | 9/2011 | Kawaguchi et al. | 400/582 |
| 2011/0297819 A1* | 12/2011 | Mukawa et al. | 250/271 |

FOREIGN PATENT DOCUMENTS

| | | |
|---|---|---|
| JP | 62-128379 A | 6/1987 |
| JP | 06-247084 A | 9/1994 |

OTHER PUBLICATIONS

Chinese Office Action for Application No. 2013012500891870 dated Jan. 30, 3013.

* cited by examiner

BOOKLET READING DEVICE

TECHNICAL FIELD

The present invention relates to a document reading device for capturing an image of a surface to be read, and more particularly to an arrangement of light sources for image capturing.

BACKGROUND ART

Conventionally, a document reading device is known for reading a code such as characters from a document. The document is composed of bound sheets. The document is, for example, a passport.

In a document reading device, a document is placed on a glass plate or the like, and a surface to be read is irradiated with illumination light to capture an image of the surface to be read. In the case where the document is a passport, for example, the surface to be read is a page carrying a photograph and the passport number. Visible light or infrared light is used as the illumination light.

The visible light is typically white light and is suitable for use in obtaining an image of the surface to be read as in an image scanner. The image is displayed on a monitor, for example.

The infrared light is suitable for reading processing such as optical character recognition. In an infrared image, background images tend to be unclear and the image has high contrast of a code such as characters. This, therefore, allows accurate reading processing.

The visible light and infrared light are an illumination light source and reflection is used. In other words, illumination light such as visible light and infrared light is reflected on the surface to be read and the reflected light is incident upon an imaging unit. In contrast, there is an ultraviolet light source as a light source which does not use reflection.

When an ultraviolet light source is used, shapes are drawn by means of a fluorescent material. When the surface to be read is irradiated with ultraviolet light, the fluorescent material is activated. The imaging unit generates an image with visible light emitted from the fluorescent material. The ultraviolet light source is used to prevent illegal acts such as tampering.

A reading device that uses illumination light is disclosed, for example, in Patent Literature 1. A reading device provided with an ultraviolet light source is disclosed, for example, in Patent Literature 2.

In conventional document reading devices, however, the device size increases when the illumination light source and the ultraviolet light source coexist. In this respect, in recent years, there has been an increasing need for functional improvement of reading devices. If two or more kinds of light sources are to be provided in order to satisfy the need, the space occupied by the light sources increases accordingly. In particular, if both a visible light source and an infrared light source are to be provided as illumination light sources, three light sources are required: visible light source, infrared light source, and ultraviolet light source. This requires even larger space. Further, in recent years, LED elements have been preferred as light sources. If two or more kinds of LED elements are to be arranged in order to provide illumination light and ultraviolet light, the number of elements, and therefore the space occupied by an array of elements, increases accordingly.

In addition, a document such as a passport is likely to curl or lift, which may cause a specular reflection condition as a lighting condition. The specular reflection condition means that the orientation of an image to be captured coincides with the direction of the specular reflection of illumination light. In the specular reflection condition, reflected light may be too strong when an image of the surface to be read is captured. As a result, a so-called "washed-out highlight" appears in the visible light image and a good image cannot be obtained. The "washed-out highlight" is a phenomenon that occurs when light incident upon an imaging device is so strong that the dynamic range of the device is exceeded and a part of image is washed out, leaving a blurred image that is whitish and without an object. In the case of infrared light, contrast of characters and the like similarly decreases and readability decreases when an image is captured in the specular reflection condition. Therefore, it is necessary to avoid the specular reflection condition for illumination light such as visible light and infrared light. In particular, it is important to avoid the specular reflection condition for a passport and the like because many of them are covered with a laminate film or the like and have high reflectance.

Conventionally, the surface to be read is illuminated from the side and an image of the surface to be read is captured directly in front. In this way, the reflection angle (=incident angle) of illumination light can be increased to avoid the specular reflection condition.

However, if deformation of a document such as curl or lift occurs, the angle of the surface to be read may vary and cause the specular reflection condition. Therefore, it is required to be able to avoid the specular reflection condition even if deformation of a document occurs.

To avoid problems described above, a conventional copier or the like is provided with a cover for pressing an object to be read. When the document is a passport or the like, however, it must be read rapidly. Therefore, it is desirable to appropriately illuminate the document without a cover or the like even if the document floats to some extent.

CITATION LIST

Patent Literature

Patent Literature 1: Japanese Patent Laid-Open No. H06-247084
Patent Literature 2: Japanese Patent Laid-Open No. S58-142486

SUMMARY OF INVENTION

Technical Problem

The present invention has been made under such circumstances. It is an object of the invention to provide a document reading device, which is provided with both a illumination light source and an ultraviolet light source, and can avoid image capturing in the specular reflection condition when the document is deformed, while the size of the device can be reduced.

Solution to Problem

One aspect of the invention is a document reading device, and the document reading device comprises: a document placing unit on which a surface to be read of a document is placed, the document being composed of a plurality of sheets bound at a binding edge; an imaging unit for taking an image of the surface to be read; an illumination light source for radiating illumination light to illuminate the surface to be read; an ultraviolet light source for radiating ultraviolet light to activate a fluorescent material on the surface to be read; wherein the illumination light source is located at a position corresponding to a first edge perpendicular to the binding edge on the surface to be read and arranged to radiate illumination light toward the surface to be read in a direction intersecting with the first edge, and the ultraviolet light source is located at a position corresponding to a second edge parallel to the binding edge on the surface to be read and arranged to radiate ultraviolet light toward the surface to be read in a direction intersecting with the second edge.

As described below, the present invention has other aspects. Therefore, the disclosure of the invention is intended to provide some of the aspects of the invention, and is not intended to limit the scope of the invention as described and claimed herein.

DESCRIPTION OF EMBODIMENTS

Figure 1:
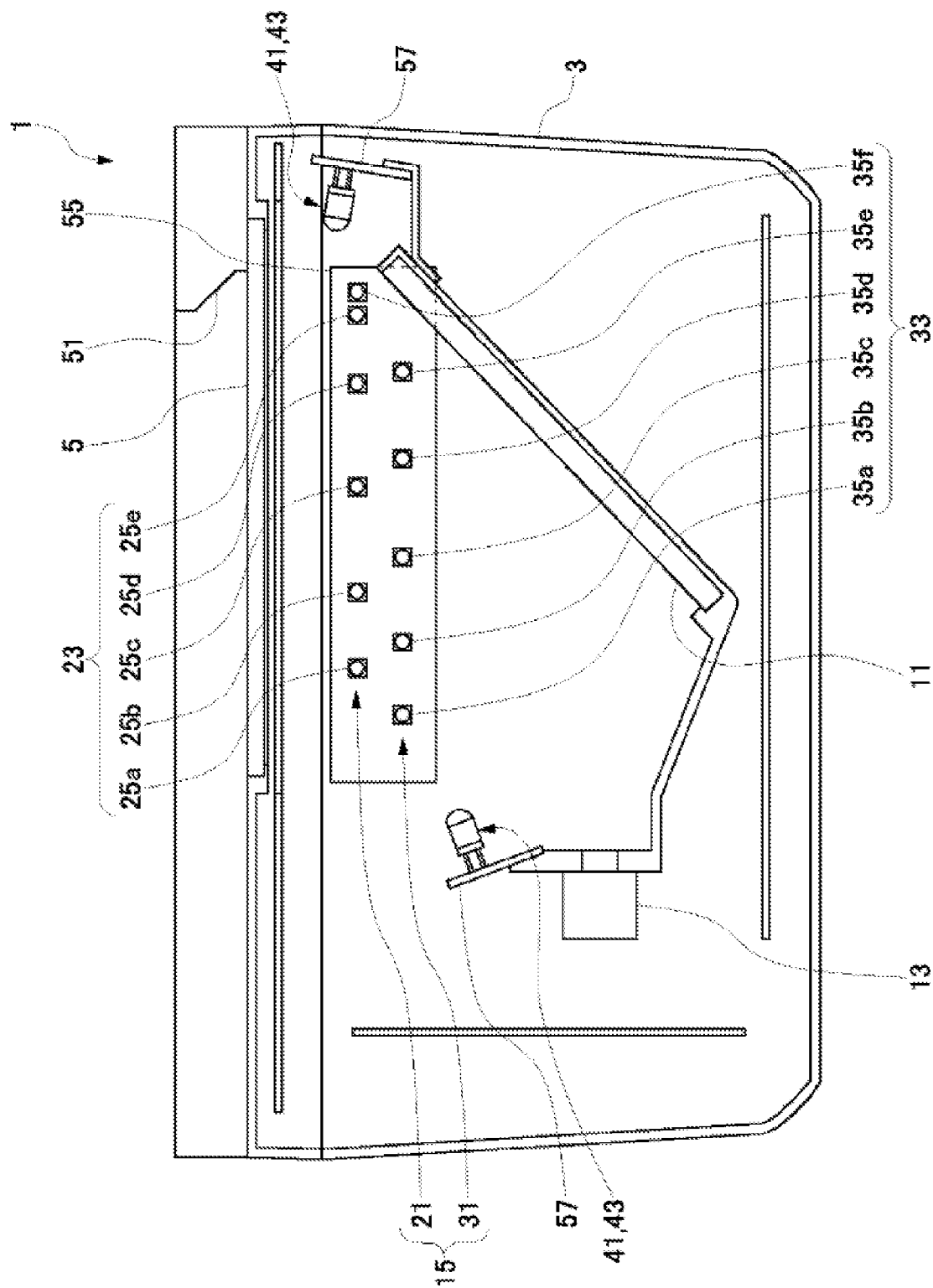
FIG. 1 is a cross-unital view of a document reading device according to an embodiment.

The present invention will now be described in detail. However, the detailed description below and attached drawings are not intended to limit the present invention. Rather, the scope of the invention is defined by the attached claims.

A document reading device according to the present invention comprises: a document placing unit on which a surface to be read of a document is placed, the document being composed of a plurality of sheets bound at a binding edge; an imaging unit for taking an image of the surface to be read; an illumination light source for radiating illumination light to illuminate the surface to be read; an ultraviolet light source for radiating ultraviolet light to activate a fluorescent material on the surface to be read; wherein the illumination light source is located at a position corresponding to a first edge perpendicular to the binding edge on the surface to be read and arranged to radiate illumination light toward the surface to be read in a direction intersecting with the first edge, and the ultraviolet light source is located at a position corresponding to a second edge parallel to the binding edge on the surface to be read and arranged to radiate ultraviolet light toward the surface to be read in a direction intersecting with the second edge.

With this configuration, the illumination light source and the ultraviolet light source are provided at positions corresponding to the first edge and the second edge, respectively. In this way, the size of device can be reduced because, instead of disposing a large light source at one place, smaller light sources are disposed at two or more locations. In addition, according to the invention, the relationship between deformation of the document and the specular reflection condition is taken into consideration in determining the light source arrangement. When the document curls or lifts, the second edge is likely to float and the angle of the surface to be read varies largely in the direction intersecting with the second edge. In the direction intersecting with the first edge, however, the angle of the surface to be read is less likely to vary. The illumination light source is therefore arranged to radiate illumination light in the direction intersecting with the first edge so as to be able to avoid image capturing in the specular reflection condition caused by the deformation of the document. On the other hand, ultraviolet light is less likely to have the problem of the specular reflection condition because the ultraviolet light is used for fluorescent activation. The ultraviolet light source is therefore disposed at a position corresponding to the second edge. In this way, according to the invention, the illumination light source and the ultraviolet light source are separately arranged while the relationship between deformation of the document and the specular reflection condition is taken into consideration. As a result, image capturing in the specular reflection condition can be avoided when the document is deformed, while the size of device can be reduced.

Further, in the document reading device according to the invention, the illumination light source may include a visible light source. With this configuration, a document reading device can be provided, which is provided with both a visible light source and an ultraviolet light source, and can avoid image capturing in the specular reflection condition when the document is deformed, while the size of the device can be reduced. The visible light source is, for example, a white light source.

Further, in the document reading device according to the invention, the illumination light source may include an infrared light source. With this configuration, a document reading device can be provided, which is provided with both an infrared light source and an ultraviolet light source, and can avoid image capturing in the specular reflection condition when the document is deformed, while the size of the device can be reduced.

Further, in the document reading device according to the invention, the illumination light source may include both a visible light source and an infrared light source, and the visible light source may be located farther away from the surface to be read in the vertical direction than the infrared light source.

With this configuration, a visible light source, an infrared light source, and an ultraviolet light source are provided. In addition, the visible light source is located farther away from the surface to be read in the vertical direction than the infrared light source. Since the infrared light source is located closer to the surface to be read, a larger area can be illuminated even with the infrared light source that has a narrow radiation angle, and readability can be assured. In addition, since the visible light source is located away from the surface to be read, the difference between the distance from one location on the surface to be read to the visible light source and the distance from another location to the visible light source is reduced, so that unevenness of illumination is also reduced and a good display image can be obtained. Therefore, a document reading device can be provided, which is provided with a visible light source, an infrared light source, and an ultraviolet light source, and can avoid image capturing in the specular reflection condition when the document is deformed, while the size of the device can be reduced and the device is capable of appropriately providing both visible and infrared light illumination.

Further, in the document reading device according to the invention, the imaging unit may have a UV cut filter. With this configuration, ultraviolet light reflecting or otherwise coming from the ultraviolet light source can be prevented from entering the imaging unit, and image quality obtained by the imaging unit can be improved.

According to the invention, since the illumination light source and the ultraviolet light source are appropriately disposed with respect to the first edge and the second edge as described above, which are perpendicular to each other, image capturing in the specular reflection condition can be avoided when the document is deformed, while the size of device can be reduced.

A document reading device according to embodiments of the present invention will now be described below with reference to drawings.

In an embodiment, the document is a passport. In addition, the illumination light source is a white light source and an infrared light source. The white light source is an example of a visible light source.

Figure 2:
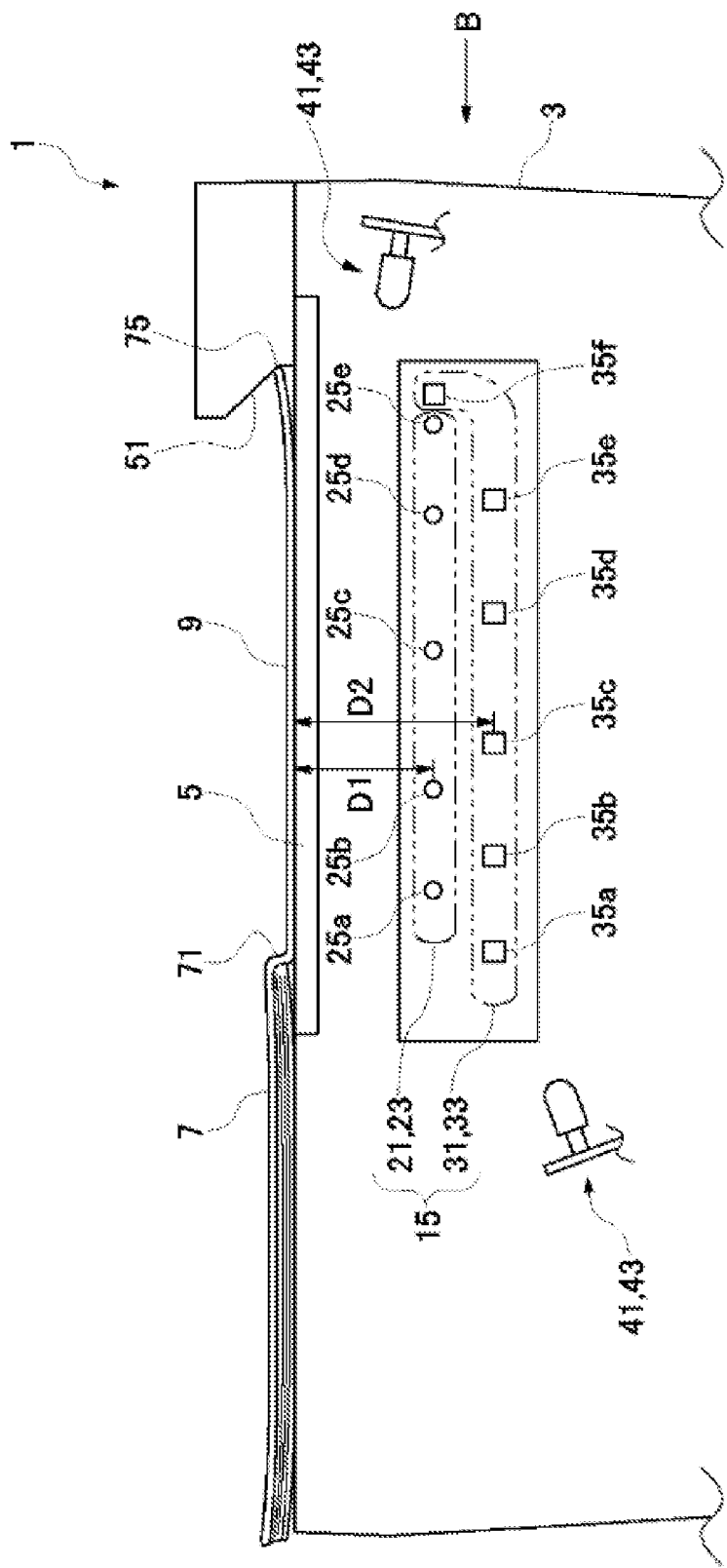
FIG. 2 is a cross-unital view of a document reading device according to the embodiment, which shows a light source arrangement.
Figure 3:
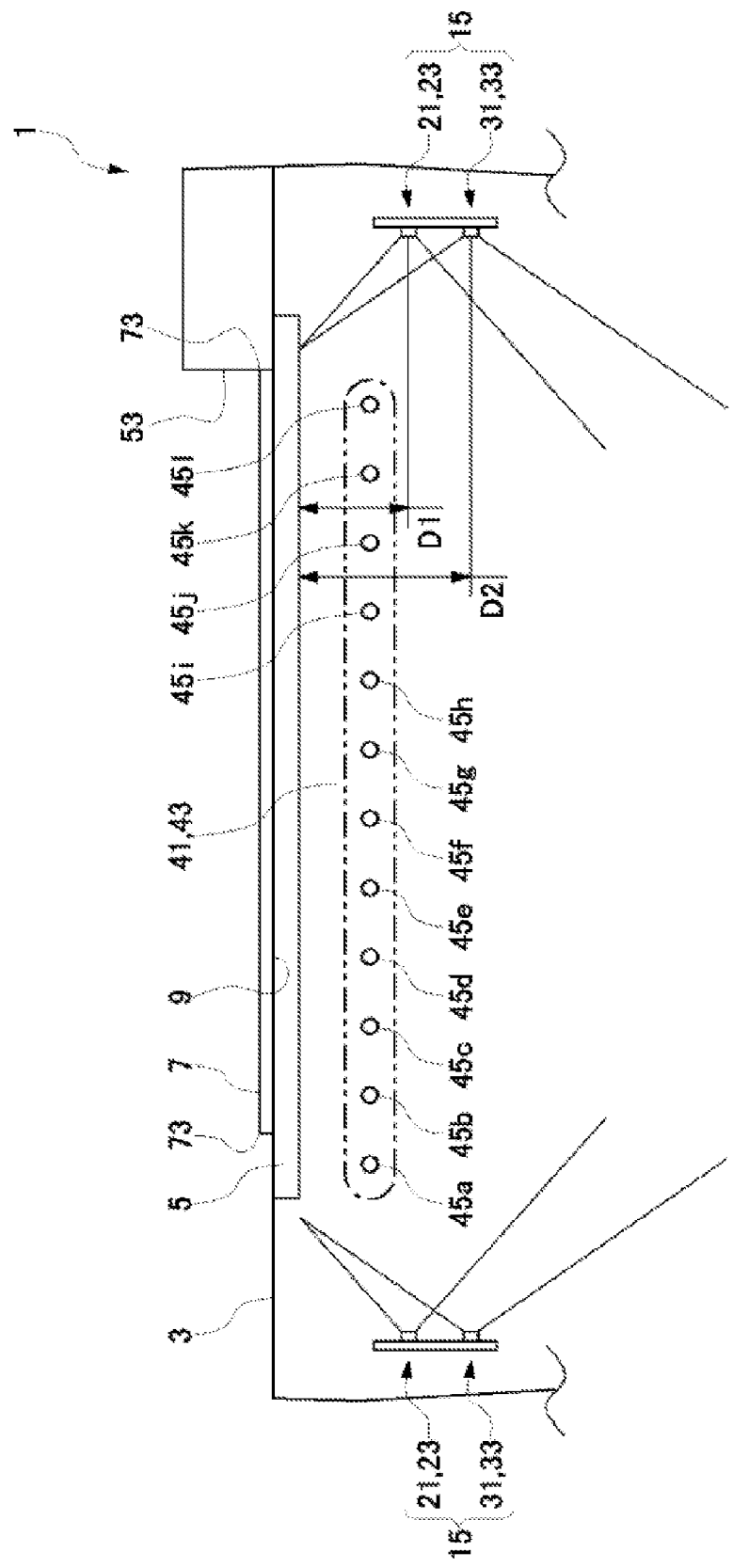
FIG. 3 is a cross-unital view of a document reading device according to the embodiment, which shows a light source arrangement.
Figure 4:
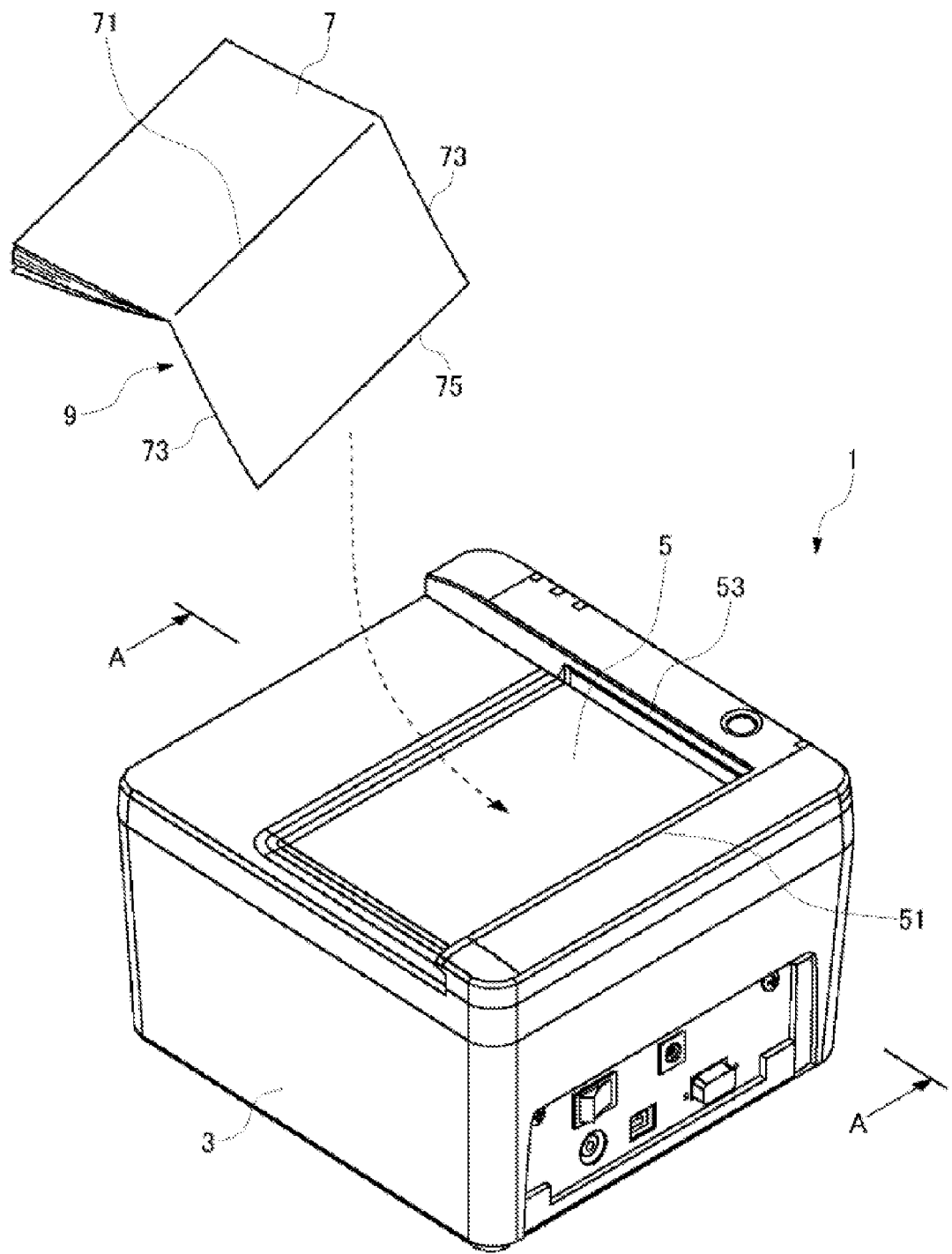
FIG. 4 is a perspective view of a document reading device according to the embodiment.

A document reading device according to the embodiment of the invention is shown in FIGS. 1 to 4. FIGS. 1 to 3 are cross-unital views and FIG. 4 is a perspective view.

Referring first to FIG. 4, a document reading device 1 has a substantially cubic housing 3, which is provided with a mounting surface 5 on the top. The mounting surface 5 is a transparent glass plate. The mounting surface 5 is a place on which a passport 7, which is an object to be read, is placed and corresponds to a document placing unit of the invention. The housing 3 is also provided with stop units 51 and 53, which are perpendicular to each other. The stop units 51 and 53 have a stop wall. Two sides of the passport 7 meeting at a right angle rest against the stop units 51 and 53, and the passport 7 is thereby positioned on the mounting surface 5.

Figure 5:
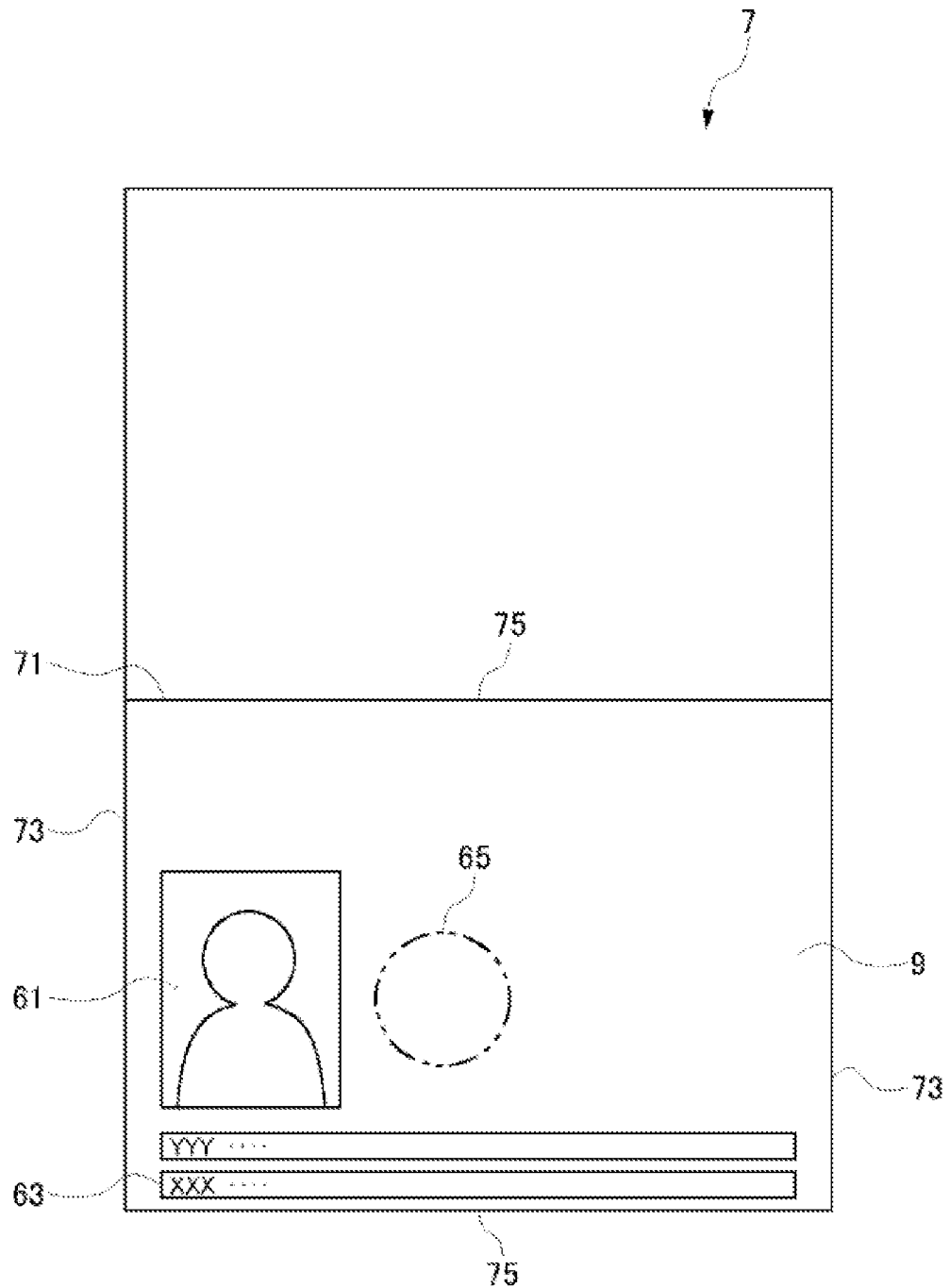
FIG. 5 shows a page to be read of a passport, which is a page to be read.

FIG. 5 schematically shows the passport 7. As described above, the passport 7 is a kind of document and composed of a plurality of sheets bound in the middle.

The passport 7 has a page to be read 9. The page to be read 9 corresponds to a surface to be read of the invention. The page to be read 9 has a photograph 61, a code 63, and a fluorescent pattern 65. The code 63 is a string of characters and the like to be read by the document reading device 1. In the passport 7, the code 63 is provided along a second edge 75. The fluorescent pattern 65 is made of a fluorescent material. The page to be read 9 is also covered with a laminate film or the like. The passport 7 is placed on the mounting surface 5 with the page to be read 9 facing downward.

The page to be read 9 also has a first edge 73 and second edge 75. The first edge 73 is an edge perpendicular to a binding edge 71 and the second edge 75 is an edge parallel to the binding edge 71. The first edge 73 and the second edge 75 meet at a right angle to each other.

In the passport 7, the page to be read 9 is a page on one side to the binding edge 71. As shown in the figure, therefore, two short sides or short edges on opposite sides of the page to be read 9 correspond to first edges 73. Similarly, long sides or long edges of the page to be read 9 are second edges 75, and the binding edge 71 itself is a second edge 75.

FIG. 1 is a cross-unital view of the document reading device 1 taken along a line A-A in FIG. 4. FIG. 2 shows a light source arrangement when viewed in the same direction as in FIG. 1, and FIG. 3 shows the light source arrangement of FIG. 2 when viewed in the direction of an arrow B.

As shown in FIG. 1, a mirror 11 is provided below the mounting surface 5, and a camera 13 is provided to the side of the mirror 11. The camera 13 corresponds to an imaging unit of the invention. The camera 13 is provided with a UV cut filter (UV filter). The camera 13 uses a reflection of the mirror 11 to capture an image of the passport 7 from underneath. The camera 13 may capture both an infrared light image and a visible light image. Alternatively, an infrared light image and a visible light image can be captured by separate cameras. In this case, the imaging unit is composed of two or more cameras.

As shown in FIGS. 1 to 3, the document reading device 1 also has an illumination light source 15 and an ultraviolet light source 41 in the housing 3, and the illumination light source 15 consists of an infrared light source 21 and a white light source 31. The white light source 31 corresponds to a visible light source of the invention.

The infrared light source 21 is composed of an infrared LED array 23, and the infrared LED array 23 consists of a plurality of infrared LEDs 25a to 25e. Similarly, the white light source 31 is composed of a white LED array 33, and the white LED array 33 consists of a plurality of white LEDs 35a to 35f. The infrared LEDs 25a to 25e and the white LEDs 35a to 35f are mounted on a circuit board 55.

Figure 6:
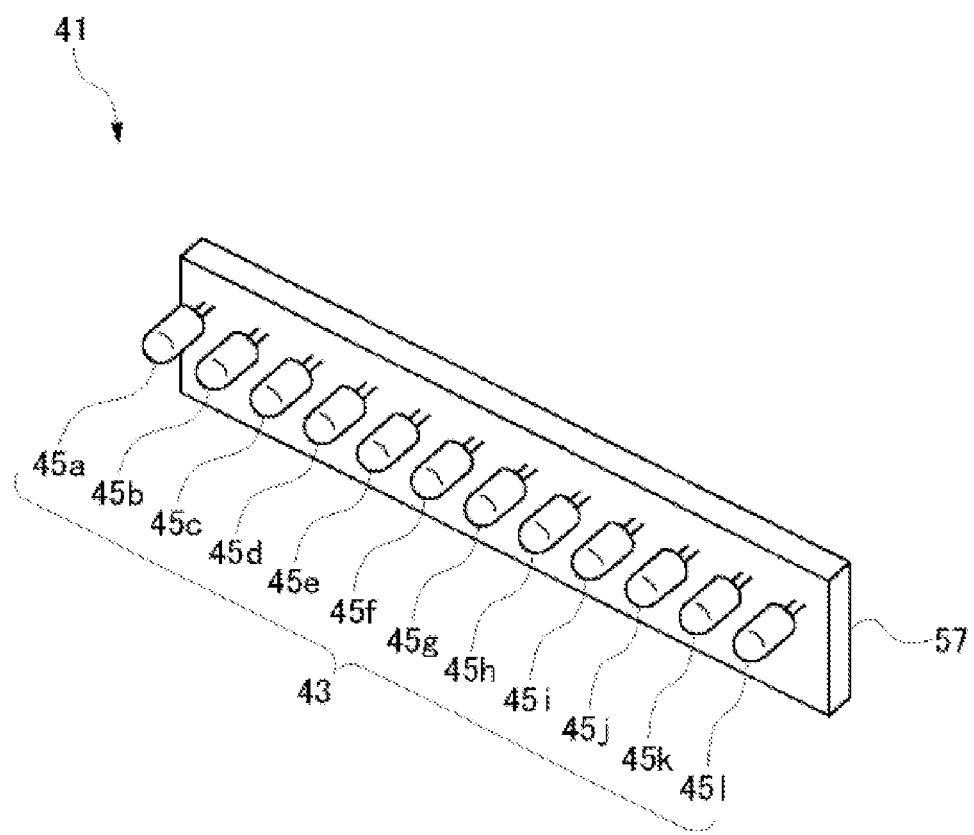
FIG. 6 shows an ultraviolet light source.

The ultraviolet light source 41 is composed of an ultraviolet LED array 43, and the ultraviolet LED array 43 consists of a plurality of ultraviolet LEDs 45a to 45l. As shown in FIGS. 1 and 6, the ultraviolet LEDs 45a to 45l are mounted on a circuit board 57, and the circuit board 57 is secured in the housing 3.

As shown in FIG. 3, the illumination light source 15 is arranged to radiate illumination light (white light and infrared light) toward the page to be read 9 in the direction intersecting with the first edge 73 from a position both outside a front area of the page to be read 9 and outside the two first edges 73. The ultraviolet light source 41 is arranged to radiate ultraviolet light toward the page to be read 9 in the direction intersecting with the second edge 75 from a position both outside a front area of the page to be read 9 and outside the two second edges 75.

As shown in FIGS. 1 to 3, in the illumination light source 15, the white light source 31 (white LED array 33) is basically located farther away from the page to be read 9 in the vertical direction than the infrared light source 21 (infrared LED array 23). Here, the vertical direction is a direction vertical to the page to be read 9 placed on the mounting surface 5, that is, a direction vertical to the mounting surface 5. In the embodiment, a second distance D2 in the vertical direction from the page to be read 9 to the white light source 31 is larger than a first distance D1 in the vertical direction from the page to be read 9 to the infrared light source 21 (FIG. 3).

In the white LED array 33, however, an endmost white LED 35f farthest from the binding edge 71 is exceptionally located closer to the page to be read 9 in the vertical direction than other white LEDs 35a to 35e. Specifically, the endmost white LED 35f is located next to an endmost infrared LED 25e in the infrared LED array 23.

The operation of the document reading device 1 according the embodiment will be described. A user first places the passport 7 on the mounting surface 5 with the page to be read 9 facing downward. The first edge 73 and the second edge 75 of the passport 7 rest against the stop units 53 and 51, respectively, and the passport 7 is thereby positioned. In response to user operation, an image of the page to be read 9 is captured.

In reading processing, the page to be read 9 is irradiated with infrared light by the infrared light source 21 and an infrared light image is generated by the camera 13. The infrared light image is then processed by a reading processing unit, not shown, to recognize a code such as characters. In an infrared light image, since a substantial amount of infrared light is absorbed by black ink, background images tend to be relatively unclear and the image has enhanced contrast of a code such as characters to be recognized. This, therefore, allows accurate reading processing. The reading processing unit may be composed of a computer. Further, the reading processing unit may be located outside the document reading device 1.

To obtain a display image, the page to be read 9 is irradiated with white light by the white light source 31 and a visible light image is generated by the camera 13. The visible light image is then displayed on a monitor, not shown.

When the fluorescent pattern 65 is used to prevent illegal acts such as tampering, the page to be read 9 is irradiated with ultraviolet light by the ultraviolet light source 41 to activate a fluorescent material in the fluorescent pattern 65 on the page to be read 9. The camera 13 then generates an image with visible light emitted from the fluorescent material. An image of the fluorescent pattern 65 thus obtained may also be output and displayed on a monitor, not shown. The image of the fluorescent pattern 65 may also be compared with a registered image to determine illegal acts. The determination may be performed either within or outside the document reading device 1.

An arrangement of the illumination light source 15 (the infrared light source 21 and the white light source 31) and the ultraviolet light source 41 according to the embodiment will now be described in detail. In the embodiment, items (1) to (3) below are taken into consideration to define the light source arrangement.

(1) In the embodiment, the illumination light source 15 is located at a position corresponding to the first edge 73 and the ultraviolet light source 41 is located at a position corresponding to the second edge 75. More specifically, a pair of illumination light sources 15 are located outside opposite first edges 73 with the page to be read 9 between the illumination light sources 15. A pair of ultraviolet light sources 41 are located outside opposite second edges 75 with the page to be read 9 between the illumination light sources 15.

In this way, the illumination light source 15 and the ultraviolet light source 41 are disposed at different locations with respect to the first edge 73 and the second edge 75 meeting at a right angle to each other. The illumination light source 15 and the ultraviolet light source 41 are not found at the same location. Therefore, the size of device can be reduced because, instead of disposing a large light source at one place, smaller light sources are disposed at two or more locations.

In particular, in the embodiment, the illumination light source 15 includes the infrared light source 21 and the white light source 31. In addition, each of the infrared light source 21, the white light source 31, and the ultraviolet light source 41 is composed of an LED array. This requires a number of LED elements to be provided. Without collected on one place, such a number of LED elements can be allocated to the first edge 73 and the second edge 75. Therefore, increase in the device size can be avoided.

(2) The illumination light source 15 is also located at a position corresponding to the first edge 73 and arranged to radiate illumination light toward the page to be read 9 in a direction intersecting with the first edge 73. More specifically, the central axis of the illumination light is intersecting at a right angle with the first edge 73. The central axis of the illumination light, however, may not be perpendicular to the first edge 73 and may be oblique within the scope of the invention.

Such an arrangement of the illumination light source 15 is advantageous to avoid the specular reflection condition. As discussed above, the specular reflection condition means that the orientation of an image to be captured coincides with the direction of the specular reflection of illumination light. In the specular reflection condition, reflected light may be too strong when an image of the page to be read 9 is captured. As a result, a so-called "washed-out highlight" appears in the visible light image and a good image cannot be obtained.

In order to avoid the specular reflection condition, it is advantageous to increase an incident angle (=reflection angle). By doing this, reflected light can be prevented from proceeding toward the mirror 11 below. In the embodiment, therefore, as shown in FIG. 2, the illumination light source 15 is located at a position outside a front area of the page to be read 9 and illuminates the page to be read 9 from the side.

A document such as the passport 7 is likely to curl or lift and is likely to float in its nature. If the document floats, the angle between the page to be read 9 and the illumination light source 15 may vary and cause the specular reflection condition. The embodiment takes the fact into consideration to avoid the specular reflection condition.

Figure 7:
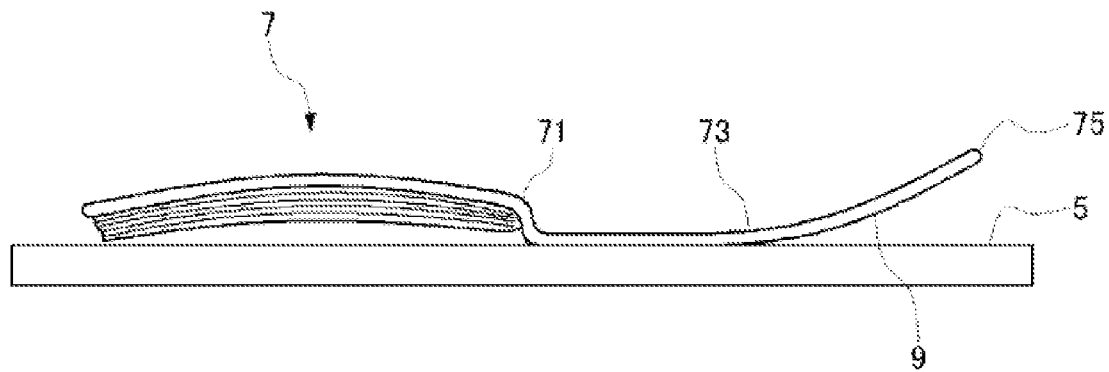
FIG. 7 shows a deformed passport.

As shown in FIG. 7, the deformation of the passport 7 is likely to occur in the page-turning direction. The deformation forces the page to be read 9 into a cylindrical curved surface. In this case, the second edge 75 floats. Accordingly, the angle of the page to be read 9 varies largely in the direction perpendicular to the second edge 75. However, the first edge 73 exhibits almost no float. Then, the angle of the page to be read 9 exhibits almost no change in the direction perpendicular to the first edge 73. This is because, in the cylindrical surface resulting from deformation, an axial line should be straight.

If the illumination light source 15 is located at a position corresponding to the second edge 75 and the deformation occurs as described above, the incident angle decreases and it is therefore likely to cause the specular reflection condition.

In the embodiment, however, the illumination light source 15 is located at a position corresponding to the first edge 73, more specifically, outside the first edge 73. In addition, the illumination light source 15 radiates illumination light in the direction intersecting with the first edge 73.

Therefore, even when the passport 7 deforms, the angle between the page to be read 9 and the illumination light source 15 does not vary largely so that the specular reflection condition can be avoided.

To avoid the problem of deformation described above, a conventional copier or the like is provided with a cover for pressing an object to be read. However, since the passport 7 is read at a location such as immigration and customs, readiness is essential. Pressing the passport 7 with the cover every time is therefore time-consuming. Contrarily, as shown in FIG. 1, the document reading device 1 according to the embodiment does not require a pressing cover so that the passport 7 can be set on the mounting surface 5 quickly.

(3) On the other hand, the ultraviolet light source 41 is located at a position corresponding to the second edge 75. The ultraviolet light source 41 is used to activate a fluorescent material. When the ultraviolet light source 41 is used, the camera 13 captures visible light emitted from the fluorescent material. Therefore, reflected ultraviolet light is not used in image capturing and is essentially independent from the problem of specular reflection condition. Further, in the embodiment, the camera 13 is provided with a UV filter to cut ultraviolet light.

Consequently, since the specular reflection condition may not need to be taken into consideration for ultraviolet light, the ultraviolet light source 41 is disposed with respect to the second edge 75.

In summary of the items (1) to (3) above, in the embodiment, the illumination light source 15 and the ultraviolet light source 41 are differently arranged while the specular reflection condition occurring when the passport 7 deforms is taken into consideration. The illumination light source 15 is then disposed with respect to the first edge 73 so as to avoid the specular reflection condition even when the passport 7 deforms. The ultraviolet light source 41 is disposed with respect to the second edge 75 because the specular reflection condition can be ignored. In this way, the illumination light source 15 and the ultraviolet light source 41 are separately arranged so as to be able to reduce the size of the device while avoiding the specular reflection condition.

Referring to items (A) to (C) below, arrangements of the infrared light source 21 and the white light source 31 in the illumination light source 15 will now be described in detail. The infrared light source 21 is located at a first distance D1 from the page to be read 9 and the white light source 31 is located at a second distance D2 from the page to be read 9; the second distance D2 is larger than the first distance D1. In other words, the infrared light source 21 is located close to the page to be read 9 and the white light source 31 is located away from the page to be read 9.

(A) Description will first be made to the setting of the first distance D1 from the page to be read 9 to the infrared light source 21. The infrared light source 21 reads, for example, the code 63 shown in FIG. 5. The code 63 is provided along a second edge 75.

In contrast, the infrared LEDs 25a to 25e of the infrared light source 21 have a narrow wavelength band and a narrow radiation angle. As described above, a radiation angle refers to a range in which the brightness of illumination light is at or above a predetermined level. The radiation angle is defined as, for example, a range of angle in which the brightness is at or above a predetermined percentage relative to a reference value that is defined as a brightness directly in front. Because of the narrow radiation angle, if the first distance D1 is large and the infrared light source 21 is located away from the page to be read 9, an area away from the infrared light source 21 can be irradiated while an area close to the infrared light source 21 cannot be irradiated, and readability may be degraded. The first distance D1 is therefore set to a distance in which the entire code 63 including an area close to the infrared light source 21 can be irradiated and readability can be assured.

(B) Next, an arrangement of the white light source 31 will be described. The arrangement of the white light source 31 is set in consideration of items (B1) and (B2) below.

(B1) The brightness of white light varies largely depending on the distance from the white light source 31. If the distance D2 from the page to be read 9 to the white light source 31 is small, the distance between one location on the page to be read 9 and the white light source 31 may be largely different from the distance between another location and the white light source 31, which causes unevenness of illumination and also unevenness in an image. Specifically, the center portion of the page to be read 9 is slightly darker because of the larger distance from the white light sources 31 on opposite sides. The second distance D2 is therefore set to a distance in which the unevenness can be reduced and required image qualify can be obtained. As a result, the distance D2 is defined as being larger than the distance D1, and therefore, the white light source 31 is located farther away from the page to be read 9 than the infrared light source 21.

(B2) The passport 7 often has the page to be read 9 covered with a transparent laminate film or the like and is provided with a light diffracting pattern on the front, on the back, or within the inside of the laminate film in order to detect a fraud. In addition, as described above, a document such as the passport 7 is likely to curl or lift in its edge and is therefore likely to float above the document reading device 1 in its nature.

When such passport 7 is illuminated, infrared light illumination with narrow wavelength band is less likely to be affected. However, visible light illumination with wide wavelength band may be affected. Specifically, if the white light source 31 was located close to the page to be read 9, an unintended pattern such as a rainbow would appear on a captured image due to the laminate film or the diffracting structure, so that a good image could not be obtained and the image displayed on the monitor might be difficult to view. In the embodiment, therefore, the distance D2 for the white light source 31 is set to a distance in which an unintended shape is less likely to appear on an image even when the passport 7 is floating above the mounting surface 5. As a result, the second distance D2 is defined as being larger than the first distance D1, and the white light source 31 is located farther away from the page to be read 9 than the infrared light source 21.

(C) Next, an arrangement of the white LED 35f on an end of the white light source 31 will be described. The arrangement of the white LED 35f is associated with the position of the code 63 on the page to be read 9. As described above, the code 63 is provided along a second edge 75 near the second edge 75 of the page to be read 9. An end of the code 63 is in close proximity to the first edge 73 of the page to be read 9 and is located at a corner of the page to be read 9.

The white LED 35f is located at the farthest end of the white LED array 33, where corresponds to the code 63 in the direction of the array. The white LED 35f is located at a position higher, that is, closer to the page to be read 9 in the vertical direction than other white LEDs 35a to 35e. Specifically, the white LED 35f is at the same height as the infrared LED array 23. The arrangement has advantages as described below.

The passport 7 may often be held in a pocket of an owner and may be wet with sweat of the owner. Wetted by sweat and subsequently dried, among other causes, the passport 7 may have a wave-like deformation (corrugation) in its edge. The first edge 73 may be on the bottom in the pocket, and the wave-like deformation is likely to occur in the first edge 73.

The wave-like deformation causes cyclical increase and decrease in the angle between the page to be read 9 and the white light source 31. In a larger angle area, the incident angle (=angle of emergence) is reduced and locally causes the specular reflection condition. Consequently, the wave-like deformation causes the specular reflection condition along the first edge 73 in a cyclical manner. As a result, as shown in the left half of FIG. 8, a plurality of spaced-apart, small washed-out areas appear along the first edge 73. Depending on the shape of the waves, the washed-out area coincides the code 63 as shown, and an end of the code 63 may be hidden by the washed-out area. This blurs the end of the code 63 in an image generated with the white light source 31. In particular, a few characters on the end of the code 63 are likely to blur.

The code 63 is an object to be automatically read with the infrared light source 21. Even in a visible light image captured by means of the white light source 31, the entire code 63 should be displayed in order to verify the result of reading or for other purposes. Therefore, the washed-out highlight phenomenon described above should be prevented.

In order to attain such objects, in the embodiment, the white LED 35f found at a position corresponding to the code 63 is located closer to the page to be read 9 locally. In this way, the incident angle (=angle of emergence) of white light becomes larger at the position of the code 63 than other positions. Consequently, even if the angle of the page to be read 9 in its corner varies due to deformation, the incident angle may not be too small and the specular reflection condition can be avoided. As a result, as shown in the right half of FIG. 8, the washed-out highlight is prevented from appearing at the position corresponding to the code 63.

Here, since the radiation range of the white LED 35f reduces when the white LED 35f is brought closer to the page to be read 9, there is a concern of unevenness in the illuminance. In the embodiment, however, only the white LED 35f is in a different position locally. With wider radiation angles, since other white LEDs 35a to 35e illuminate the entire area of the page to be read 9, an unevenness in the illuminance intense enough to affect an image may not occur.

Figure 8:
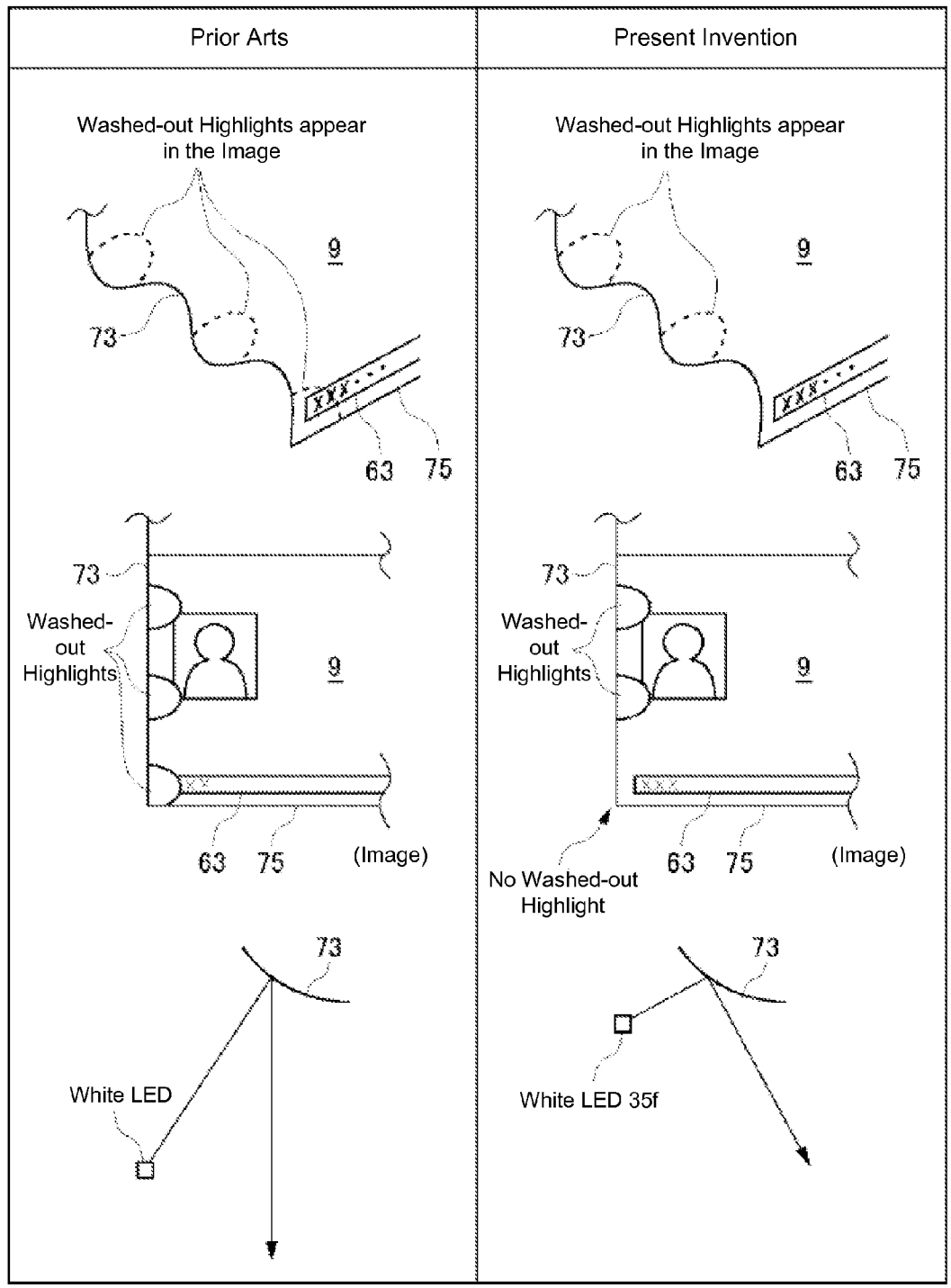
FIG. 8 shows the principle of the present invention for preventing a washed-out highlight at a code location when a wave-like deformation occurs in the passport.

As shown in FIG. 8, washed-out highlights remain at locations without the code 63. As compared with the code 63, however, other areas are much less important. In the embodiment, therefore, washed-out highlights in less important areas are considered as being acceptable and a good image of the code 63 area is obtained.

Next, variations of the item (C) above will be described. The code 63 described above is an example of a near-edge code. A near-edge code herein is a code located close to an edge of an object to be read. Specifically, a near-edge code is a code located close to an edge on the side of a light source used for obtaining a display image, and at least a part of the code is located close to the edge. In case of a passport 7 as the object to be read, the near-edge code is located at an end of an edge, and an endmost white LED is in proximity to the object to be read. However, depending on the type of the object to be read, the position or the like of the near-edge code may vary, and therefore the light source arrangement may vary accordingly.

For example, the near-edge code may be centered on an edge. In this case, in agreement with the near-edge code, a white LED corresponding to the center of the edge is brought closer to the object to be read.

Further, two or more white LEDs may be brought closer to an object to be read for one near-edge code. In other words, at least one white LEDs may be brought closer to the object to be read within the scope of the invention. A white LED(s) that should be brought closer to an object to be read may be determined depending on spacing between elements and the width of a code.

Further, a near-edge code may not necessarily be located at one position. Two or more near-edge codes may be provided. In this case, two or more white LEDs may be brought closer to an object to be read at two or more respective positions.

Further, two or more near-edge codes may each have a different purpose, significance, use, importance, or the like. Therefore, the position of only a white LED corresponding to a necessary near-edge code may be changed.

A document reading device 1 according to an embodiment of the present invention have been described. According to the embodiment, the illumination light source 15 is located at a position corresponding to the first edge 73 perpendicular to the binding edge 71 on the surface to be read and arranged to radiate illumination light toward the surface to be read in the direction intersecting with the first edge 73. The ultraviolet light source 41 is located at the position corresponding to the second edge 75 parallel to the binding edge 71 on the surface to be read and arranged to radiate ultraviolet light toward the surface to be read in the direction intersecting with the second edge 75. Therefore, the size of device can be reduced because, instead of disposing a large light source at one place, smaller light sources are disposed at two or more locations.

In addition, according to the invention, the relationship between deformation of the document and the specular reflection condition is taken into consideration in determining the light source arrangement. When the document curls or lifts, the second edge 75 is likely to float and the angle of the surface to be read varies largely in the direction intersecting with the second edge 75. In the direction intersecting with the first edge 73, however, the angle of the surface to be read is less likely to vary. The illumination light source 15 is therefore arranged to radiate illumination light in the direction intersecting with the first edge 73 so as to be able to avoid image capturing in the specular reflection condition caused by the deformation of the document. On the other hand, ultraviolet light is less likely to have the problem of the specular reflection condition because the ultraviolet light is used for fluorescent activation. The ultraviolet light source 41 is therefore disposed at a position corresponding to the second edge 75.

In this way, according to the invention, the illumination light source 15 and the ultraviolet light source 41 are separately arranged in an appropriate way while the relationship between deformation of the document and the specular reflection condition is taken into consideration. As a result, image capturing in the specular reflection condition can be avoided when the document is deformed, while the size of device can be reduced.

Further, in the embodiment, the illumination light source 15 may include both a white light source 31 and an infrared light source 21, and the visible light source 31 may be located farther away from the surface to be read in the vertical direction than the infrared light source 21. Since the infrared light source 21 is located closer to the surface to be read, a larger area can be illuminated even with the infrared light source that has a narrow radiation angle, and readability can be assured. In addition, since the visible light source 31 is located away from the surface to be read, the difference between the distance from one location on the surface to be read to the visible light source 31 and the distance from another location to the visible light source 31 is reduced, so that unevenness of illumination is also reduced and a good display image can be obtained. Therefore, a document reading device 1 can be provided, which is provided with a visible light source 31, an infrared light source 21, and an ultraviolet light source 41, and can avoid image capturing in the specular reflection condition when the document is deformed, while the size of the device can be reduced and the device is capable of appropriately providing both visible and infrared light illumination.

Further, in the embodiment, the imaging unit has a UV cut filter. With this configuration, ultraviolet light reflecting or otherwise coming from the ultraviolet light source can be prevented from entering the imaging unit, and image quality obtained by the imaging unit can be improved.

Preferred embodiments according to the present invention have been described. The present invention, however, is not limited to the above embodiments and those skilled in the art can off course make various modifications to the above embodiments within the scope of the invention.

Although currently possible preferred embodiments of the invention have been described above, it is understood that various modifications can be made to the embodiments and it is intended that all such modifications that fall within the true spirit and scope of the invention are covered by the attached claims.

INDUSTRIAL APPLICABILITY

As described above, a document reading device according to the invention provides an advantage of being capable of avoiding image capturing in the specular reflection condition when the document is deformed, while the size of the device can be reduced, and is useful for a passport reader, for example.

REFERENCE SIGNS LIST

1 Document reading device
5 Mounting surface
7 Passport
9 Page to be read
11 Mirror
13 Camera
15 Illumination light source
21 Infrared light source
22 Infrared LED array
25a-25e Infrared LED
31 White light source
32 White LED array
35a-35f White LED
41 Ultraviolet light source
43 Ultraviolet LED array
45a-45l Ultraviolet LED
63 Code
65 Fluorescent pattern
71 Binding edge
73 First edge
75 Second edge

The invention claimed is:

1. A document reading device comprising:
a document placing unit on which a surface to be read of a document is placed, the document being composed of a plurality of sheets bound at a binding edge;
an imaging unit which takes an image of the surface to be read;
an illumination light source which radiates illumination light to illuminate the surface to be read;
an ultraviolet light source which radiates ultraviolet light to activate a fluorescent material on the surface to be read;
wherein the illumination light source is located at a position corresponding to a first edge perpendicular to the binding edge on the surface to be read and arranged to radiate illumination light toward the surface to be read in a direction intersecting with the first edge, and the ultraviolet light source is located at a position corresponding to a second edge parallel to the binding edge on the surface to be read and arranged to radiate ultraviolet light toward the surface to be read in a direction intersecting with the second edge.

2. The document reading device according to claim 1, wherein the illumination light source includes a visible light source.

3. The document reading device according to claim 1, wherein the illumination light source includes an infrared light source.

4. The document reading device according to claim 1, wherein the illumination light source includes both a visible light source and an infrared light source, and the visible light source is located farther away from the surface to be read in the vertical direction than the infrared light source.

5. The document reading device according to claim 1, wherein the imaging unit has a UV cut filter.

* * * * *

UNITED STATES PATENT AND TRADEMARK OFFICE
CERTIFICATE OF CORRECTION

PATENT NO. : 8,559,073 B2  Page 1 of 1
APPLICATION NO. : 13/062783
DATED : October 15, 2013
INVENTOR(S) : Mukawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 170 days.

Signed and Sealed this

Fifteenth Day of September, 2015

Michelle K. Lee
*Director of the United States Patent and Trademark Office*